United States Patent [19]

Ikeda

[11] Patent Number: 4,926,471
[45] Date of Patent: May 15, 1990

[54] COMMUNICATION SYSTEM

[75] Inventor: Toshio Ikeda, Yokohama, Japan

[73] Assignee: Canon Kabushiki Kaisha, Tokyo, Japan

[21] Appl. No.: 311,362

[22] Filed: Feb. 16, 1989

Related U.S. Application Data

[63] Continuation of Ser. No. 55,022, May 28, 1987, abandoned.

[30] Foreign Application Priority Data

Jun. 2, 1986 [JP] Japan ................. 61-125663

[51] Int. Cl.⁵ .......................................... H04M 3/42
[52] U.S. Cl. ................... 379/216; 379/354; 379/142
[58] Field of Search .............. 379/216, 354, 355, 356, 379/357, 142

[56] References Cited

U.S. PATENT DOCUMENTS 4,709,387 11/1987 Masuda ........................ 379/355 X

FOREIGN PATENT DOCUMENTS 2582889 12/1986 France ..................... 379/247
0012463 1/1983 Japan ....................... 379/354
0072262 4/1984 Japan ....................... 379/216

OTHER PUBLICATIONS

"Effective and Economical Speed Calling Service with Fujitsu's Abbreviated Dial Memory System", 1972, pp. 1-10.

Primary Examiner—James L. Dwyer
Attorney, Agent, or Firm—Fitzpatrick, Cella, Harper & Scinto

[57] ABSTRACT

There is disclosed a communication system, such as a telephone exchange with an automatic dialling function, in which the telephone number of the destination called by automatic dialling is made known to the calling terminal or telephone, so that the user can confirm the destination in advance before the communication is made.

6 Claims, 3 Drawing Sheets

FIG. 2

| ✱ | 0 | 4 |

| 6 | 0 | 4 |

FIG. 3

| 1 | 2 | 3 | 4 | 5 | 6 | 7 |

| X | X | X | K | . | K | . |

COMMUNICATION SYSTEM

This application is a continuation of application Ser. No. 055,022 filed May 28, 1987 now abandoned.

BACKGROUND OF THE INVENTION

1. Field of the Invention

The present invention relates to a communication system with an automatic dialling function such as a contracted number dialling function.

2. Related Background Art

In the field of such communication systems, there is already known, for example, a telephone exchange apparatus with an automatic dialling function, in which said exchange apparatus performs automatic dialling according to abbreviated dial number information entered from a telephone unit.

In such a telephone system, in the case of making a telephone call by dialling an abbreviated number, the caller is usually unable to know whether a desired telephone number is properly dialled until the line is actually connected to the destination.

Also there is recently known a telephone unit with a number display function for displaying the telephone number of the destination, in which the dialled telephone number can be confirmed even in an abbreviated number dialling. However such a telephone with display function is inevitably complex in its structure.

SUMMARY OF THE INVENTION

An object of the present invention is to avoid the above-explained drawbacks.

Another object of the present invention is to provide an improved communication system.

Still another object of the present invention is to provide a communication system in which, when a call is made by the exchange apparatus in response to a request for call from a terminal, the destination called by the exchange apparatus is made known to said requesting terminal.

Still another object of the present invention is to provide a communication system in which the exchange apparatus has an automatic dialling function such as abbreviated number dialling, wherein the destination dialled in such abbreviated number dialling can be confirmed.

Still another object of the present invention is to inform the operator of the information of the called destination in the form of voice information.

Still other objects of the present invention, and the advantages thereof, will become fully apparent from the following description of the embodiments, to be taken in conjunction with the appended drawings.

BRIEF DESCRIPTION OF THE DRAWINGS

FIG. 2 is a view showing examples of abbreviated dialling numbers in said embodiment;

FIG. 3 is a view showing examples of dialling number data and character train data in said embodiment.

DETAILED DESCRIPTION OF THE PREFERRED EMBODIMENTS

Figure 1:
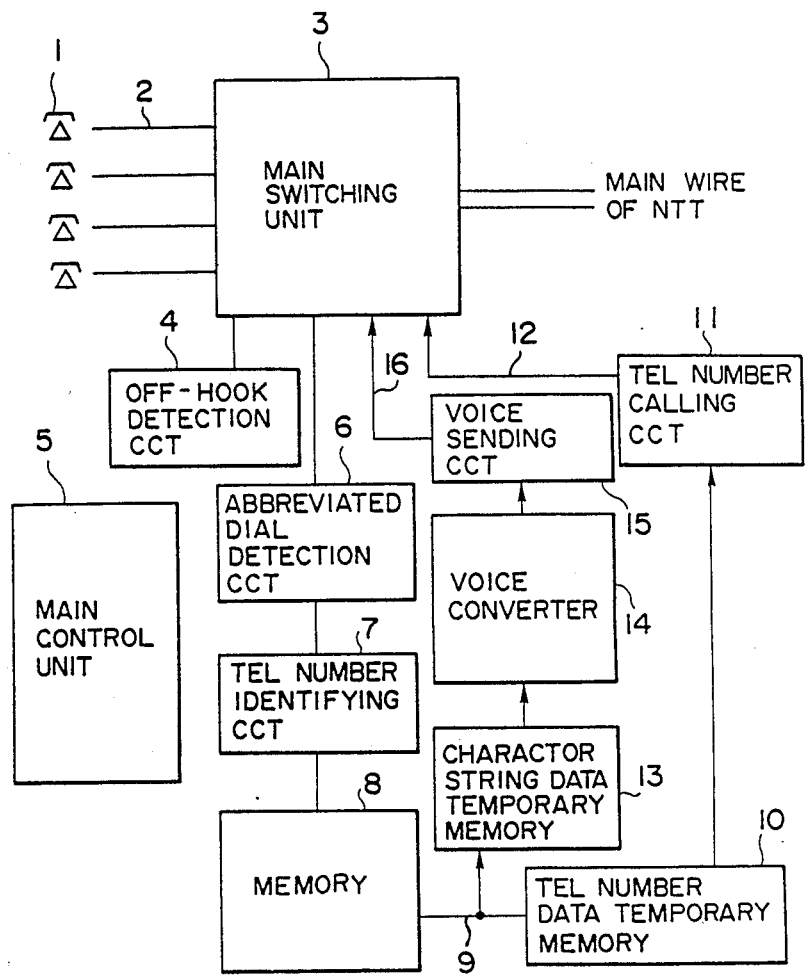
FIG. 1 is a block diagram of an embodiment of the present invention.

Now the present invention will be clarified in greater detail by an embodiment thereof shown in the appended drawings FIG. 1 is a block diagram of a local telephone exchange system constituting an embodiment of the communication system of the present invention. Portions not related to the present invention will be omitted from the following description.

In FIG. 1 there are shown extension telephone units 1; extension telephone lines 2 therefor; a main switch unit 3 constituting the main part of the local exchange apparatus to which said extension telephone lines 2 are connected, an off-hook detecting circuit 4 for detecting the off-hook state of each extension telephone unit 1. Also shown are a main control circuit 5 for controlling the entire local telephone exchange system, an abbreviated dialling detecting circuit 6 for discriminating whether the number called by an extension telephone unit 1 is an abbreviated dialling number, a number identifying circuit 7 for identifying and storing the abbreviated dialling number detected by said abbreviated dialling detecting circuit 6, a memory circuit 8 storing telephone number data and character train data such as a company name, corresponding to each abbreviated dialling number identified by said number identifying circuit 7 and an output data line 9 therefor. Also shown are a number data temporary memory circuit 10 for temporarily storing the telephone number data released from the memory circuit 8 through the output data line 9, a telephone number calling circuit 11 for dialling according to the data from said temporary memory circuit 10, a dialling output line 12 for performing a function equivalent to ordinary dialling in the extention telephone unit 1 in response to the output of said telephone number calling circuit 11 and a character train temporary memory circuit 13 for temporarily storing the character train released from said memory circuit 8. Also shown are a voice conversion circuit 14 for receiving data, character by character, from said temporary memory circuit 13 and converting said data into voice information, a voice sending circuit 15 for sending the signals obtained in said voice conversion circuit 14 to the calling extension telephone unit 1 and a voice output line 16 for connecting the output of said voice sending circuit 15 to the calling extension telephone unit 1.

Figures 2, 3:
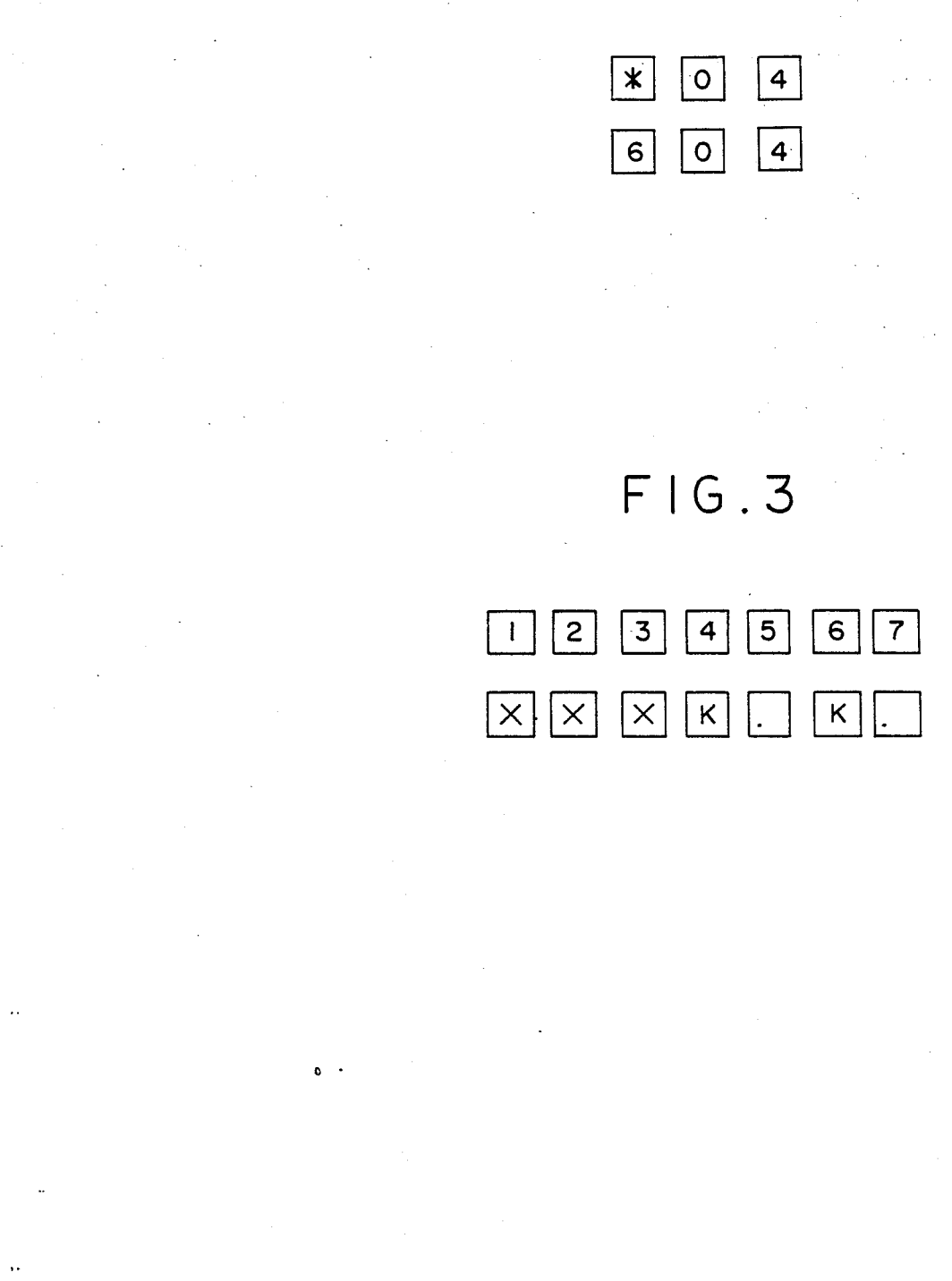

FIG. 2 illustrates example of abbreviated dialling numbers, wherein the first number "6" or the first symbol "*" is a function code for abbreviated dialling number, and the following two numerals indicate a destination.

FIG. 3 illustrates a telephone number, for example "123-4567" and a company name of the destination, for example "XXCORP.", which are stored in the memory circuit 8 corresponding to the last two numerals "04" shown in FIG. 2 and which are entered in advance into the communication system by another operation.

Figure 4:
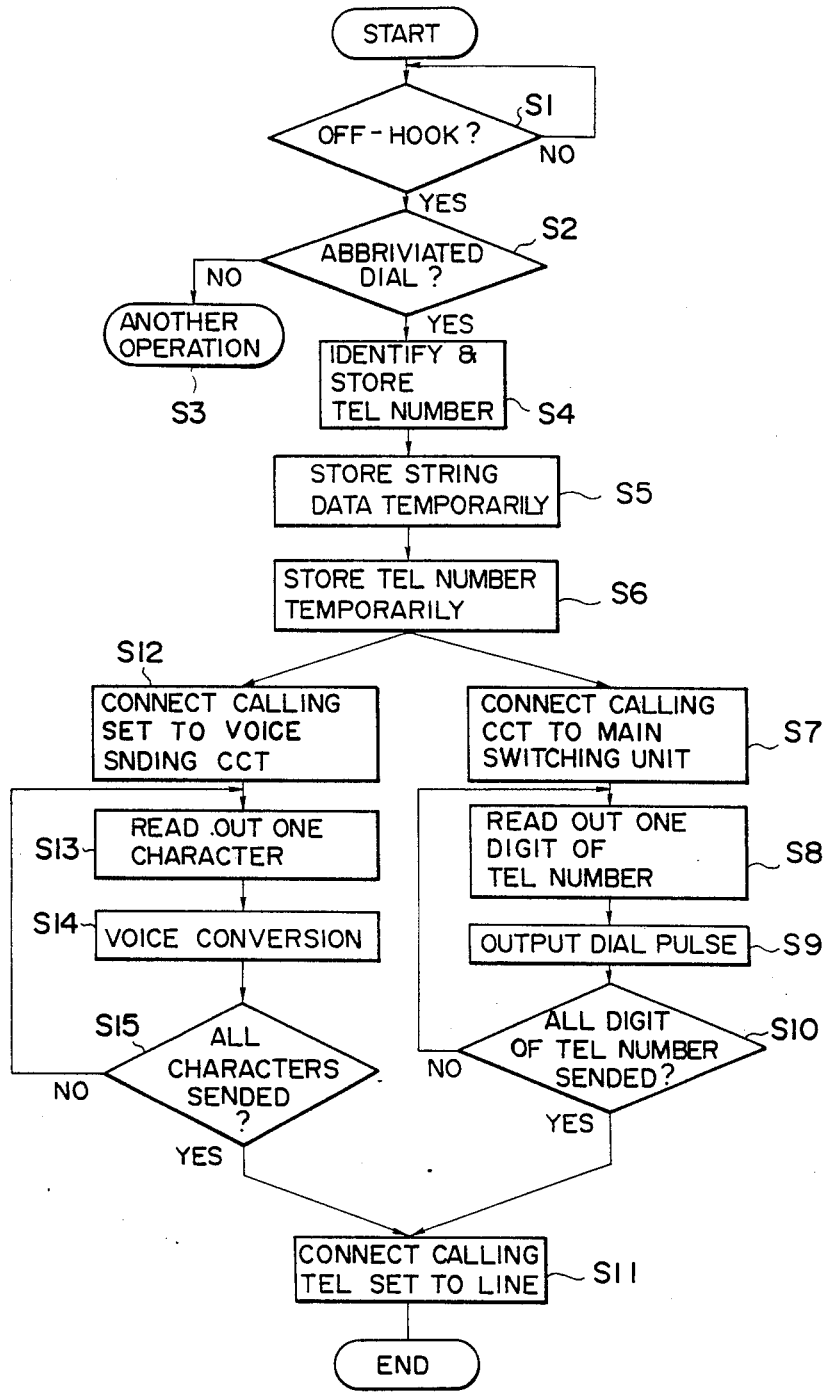
FIG. 4 is a flow chart of the control sequence of said embodiment.

Now reference is made to a flow chart in FIG. 4 for explaining the abbreviated dialling function of the present embodiment.

When the handset of an extension telephone unit 1 is lifted to the off-hook state, this state is detected by the off-hook detecting circuit 4 through the extension telephone line 2 (step S1).

At first when a number or a symbol indicating an abbreviated dialling number ("6" or "*" in the example shown in FIG. 2) is entered by a key or dialled, the abbreviated dialling detection circuit 6 is activated (step S2) whereby the program proceeds to a next step. In other cases the program branches to a step S3.

Then the number identifying circuit 7 is activated to identify and store the abbreviated dialling number entered from the extension telephone unit 1 (step S4). In case of the example shown in FIG. 2, the numbers "0" and "4" are stored, as the abbreviated dialling number, in the number identifying circuit 7. Then, in response to the output of said number identifying circuit 7, the main control circuit 5 causes the memory circuit 8 to release character train data ("XXCORP." shown in FIG. 3), corresponding to the abbreviated dialling number ("04" in FIG. 2), through the output data line 9, and said data are stored in the character data temporary memory circuit 13 (step S5). Then the main control circuit 5 causes the memory circuit 8 to release number data ("123-4567" in FIG. 3) through the output data line 9, and said data are stored in the number data temporary memory circuit 10 (step S6).

The following functions are conducted simultaneously in parallel manner.

In the first place, the main control circuit 5 connects the dialling output line 12 to the main switch unit 3 in the same manner as if a call is made by the extension telephone unit 1 (step S7). Then said main control circuit 5 retrieves a number (for example the first number "1" in FIG. 3) from the number data temporary memory circuit 10 (step S8), and supplies said number to the telephone number calling circuit 11, which in turn supplies the main switch unit 3 with dialling pulses or tone dialling signals corresponding to said number through the dialling output line 12 (step S9). Then the steps S8 and S9 are repeated to release all the number data ("123-4567" in FIG. 3) in succession from the temporary memory circuit 10 (step S10).

On the other hand, the main control circuit 5 connects the voice output line 16 to the calling extension telephone unit 1 (step S12), reads the character data in succession (for example the first character "X" in FIG. 3) from the character temporary memory circuit 13 (step S13), and supplies said data to the voice converting circuit 14 which sends the corresponding voice wave form to the extension telephone unit 1 through the voice sending circuit 15 and the voice output line 16 (step S14). The steps S13 and S14 are repeated to release all the character data stored in the character temporary memory circuit 13, whereby a voice corresponding to the character train data (for example "XXCORP." in FIG. 3) is heard (step S15).

In this manner, during an automatic dialling operation, the name of the destination is confirmed in voice.

After the foregoing steps, the main control circuit 5 connects the calling extension telephone unit 1 to the line of the telephone unit of destination, thereby completing the abbreviated dialling service function (step S11).

In the foregoing description there has not been explained the function of one-touch outside dialling. In such dialling, the abbreviated dialling detection circuit 6 also discriminates whether the dialling information entered from the extension telephone unit 1 is a one-touch dialling number. Then the number identifying circuit 7 identifies the one-touch dialling number, and, in response, the main control circuit 5 retrieves, from the memory circuit 8, a number corresponding to the identified one-touch dialling number. The following operations are conducted in the same manner as in the abbreviated number dialling.

As explained in the foregoing, the present embodiment allows the caller to exactly confirm the destination immediately after a call is made by abbreviated number dialling, so that an eventually misplaced call can be immediately cancelled. Also the voice information, if including the name of person of the destination, avoids the necessity of confirmation of said name by other means, and still the telephone unit does not require any additional function. Also the present embodiment allows the caller to confirm the destination before the handset is picked up at the destination.

In the foregoing description the abbreviated number dialling function is incorporated in the exchange apparatus, but a similar effect can be achieved also when the telephone unit itself has said function.

The present invention is not limited to the foregoing embodiment but is subject to various modifications within the scope and spirit of the appended claims.

I claim:

1. A communication system comprising:
a plurality of communication terminals; and
an exchange unit for controlling switching between said communication terminals;
wherein said exchange unit comprises:
calling means for performing a calling operation in response to destination information from at least one of said communication terminals;
means for connecting said at least one communication terminal and another of said communication terminals called by said calling means; and
means for informing said at least one communication terminal of the identity of said other communication terminal called by said calling means.

2. A communication system according to claim 1, wherein said informing means is adapted to inform said at least one communication terminal of voice information concerning said called communication terminal.

3. A communication system according to claim 1, wherein said informing means is adapted to inform only said at least one communication terminal which has requested a call, among said plural communication terminals, of said called communication terminal.

4. A communication system according to claim 1, wherein the destination information from said communication terminal is abbreviated dialing number information, and said calling means is adapted to perform a calling operation on the basis of said abbreviated dialing number information.

5. A communication system according to claim 4, wherein said calling means comprises memory means storing dialling number data corresponding to said abbreviated dialling number information, and is adapted to call dialling numbers stored in said memory means.

6. A communication system comprising:
a plurality of communication terminals; and
an exchange unit for controlling switching between said communication terminals;
wherein said exchange unit comprises:
calling means for performing a calling operation in response to destination information from at least one of said communication terminals;
means for connecting said at least one communication terminal and another of said communication terminals called by said calling means;
means for informing said at least one communication terminal of said other communication terminal called by said calling means, wherein said informing means is adapted to inform said at least one communication terminal of voice information concerning said called communication terminal; and
memory means for storing the information concerning said terminal called by said calling means, wherein said informing means includes conversion means for converting the information stored in said memory means into voice information and informs said at least one communication terminal of the converted voice information.

* * * * *